(12) United States Patent
Miyamoto et al.

(10) Patent No.: US 11,231,753 B2
(45) Date of Patent: Jan. 25, 2022

(54) ELECTRONIC APPARATUS HAVING AN ANTENNA DEVICE

(71) Applicant: LENOVO (SINGAPORE) PTE. LTD., Singapore (SG)

(72) Inventors: Tabito Miyamoto, Kanagawa (JP); Shinichi Kubota, Kanagawa (JP); Fumitake Mizoguchi, Kanagawa (JP); Hiroaki Kinoshita, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 128 days.

(21) Appl. No.: 16/878,153

(22) Filed: May 19, 2020

(65) Prior Publication Data
US 2020/0371562 A1   Nov. 26, 2020

(30) Foreign Application Priority Data

May 20, 2019   (JP) .............................. JP2019-094491

(51) Int. Cl.
*G06F 1/16* (2006.01)
*H01Q 1/24* (2006.01)
(52) U.S. Cl.
CPC .......... *G06F 1/1681* (2013.01); *G06F 1/1637* (2013.01); *H01Q 1/243* (2013.01)
(58) Field of Classification Search
CPC combination set(s) only.
See application file for complete search history.

(56) References Cited

U.S. PATENT DOCUMENTS

| | | | | |
|---|---|---|---|---|
| 6,885,880 B1* | 4/2005 | Ali | ........................ | G06F 1/1616 455/575.7 |
| 7,839,340 B2* | 11/2010 | Yamazaki | ................ | H01Q 9/40 343/702 |
| 8,059,039 B2* | 11/2011 | Ayala Vazquez | .... | H01Q 1/2266 343/702 |
| 8,059,040 B2* | 11/2011 | Ayala Vazquez | ........ | H01Q 1/38 343/702 |
| 8,264,412 B2* | 9/2012 | Ayala | ................... | H01Q 1/2266 343/702 |
| 8,325,096 B2* | 12/2012 | Ayala Vazquez | ........ | H01Q 1/38 343/702 |
| 8,482,469 B2* | 7/2013 | Ayala | ....................... | H01Q 9/42 343/702 |
| 10,720,693 B2* | 7/2020 | Yamamoto | ............... | H01Q 1/48 |

(Continued)

FOREIGN PATENT DOCUMENTS

JP   2003-264414 A   9/2003
JP   2018121149 A   8/2018

*Primary Examiner* — Lisa Lea-Edmonds
(74) *Attorney, Agent, or Firm* — Antony P. Ng; Russell Ng PLLC

(57) ABSTRACT

An electronic apparatus is disclosed. The electronic apparatus includes a hinge device rotatably coupling a main body chassis and a display chassis; and an antenna device for transmitting and receiving a radio wave. The hinge device includes a metal hinge shaft, a metal bearing part, a metal chassis mount member, and a hinge chassis that is made of a radio wave transmissive material. The antenna device includes a holder component housed in the hinge chassis, an antenna element supported by the holder component and a ground element supported by the holder component and electrically connected to the bearing part.

13 Claims, 6 Drawing Sheets

(56) References Cited

U.S. PATENT DOCUMENTS

| | | | | |
|---|---|---|---|---|
| 10,819,005 B2* | 10/2020 | Jian | ............... | G06F 1/1616 |
| 10,831,245 B1* | 11/2020 | Miyamoto | ............... | G06F 1/1618 |
| 11,005,154 B2* | 5/2021 | Hung | ............... | H01Q 1/48 |
| 11,075,443 B2* | 7/2021 | Yoo | ............... | H01Q 7/00 |
| 2012/0068893 A1* | 3/2012 | Guterman | ............... | H01Q 5/378 |
| | | | | 343/702 |
| 2016/0118718 A1* | 4/2016 | Guterman | ............... | H01Q 5/378 |
| | | | | 343/702 |
| 2018/0254540 A1* | 9/2018 | Yoo | ............... | G06F 1/1681 |
| 2020/0371562 A1* | 11/2020 | Miyamoto | ............... | G06F 1/1681 |

\* cited by examiner

ELECTRONIC APPARATUS HAVING AN ANTENNA DEVICE

PRIORITY CLAIM

The present application claims benefit of priority under 35 U.S.C. §§ 120, 365 to the previously filed Japanese Patent Application No. JP2019-094491 with a priority date of May 20, 2019, which is incorporated by reference herein.

TECHNICAL FIELD

The present invention relates to electronic apparatuses in general, and in particular to an electronic apparatus having an antenna device.

BACKGROUND

An electronic apparatus such as a notebook type personal computer (laptop PC) generally uses various radio communication techniques including a wireless local-area network (LAN), a wireless wide-area network (WAN) and so on. Taking a laptop PC as an example, it is preferable for an antenna device equipped therein to be always capable of good transmission and reception of radio waves regardless of a rotation angle formed between a display chassis and a main body chassis.

In this regard, a prior art electronic apparatus includes an antenna device mounted in a hinge device that couples a display chassis and a main body chassis. The hinge device thus always faces outside the apparatus irrespective of an angular position of the display chassis, which results in good antenna quality.

The antenna device structured requires to frame-ground a ground element to the main body chassis or the display chassis. As such, where the antenna device is mounted in the hinge device as in the above-mentioned prior art device, the ground element is drawn out of the hinge device to be frame-grounded. It is then, however, necessary to ensure that the ground element drawn out of the hinge device does not twist or break due to the movement of the hinge device, which has caused complexities in structure and design of the hinge device and the antenna device of such conventional technique. In addition, the ground element needs to be separated from the chassis of a finished product for, e.g., replacement of the antenna device, which has resulted in low working efficiency.

Consequently, it would be desirable to provide an electronic apparatus that enables an antenna device to be frame-grounded by a simple structure while allowing the antenna device to be mounted in a hinge device.

SUMMARY

In accordance with an embodiment of the present disclosure, an electronic apparatus includes a first chassis; a second chassis; a hinge device rotatably coupling the first chassis and the second chassis; and an antenna device for transmitting and receiving a radio wave. The hinge device includes a metal hinge shaft; a metal bearing part rotatably supports a first end of the hinge shaft; a metal chassis mount member fixes a second end of the hinge shaft to the first chassis or the second chassis; and a hinge chassis, made of a radio wave transmissive material, for housing the bearing part. The antenna device includes a holder component, which is housed in the hinge chassis, is fixed to the bearing part using a metal screw; an antenna element supported by the holder component; and a ground element, which is supported by the holder component, is electrically connected to the bearing part and the metal screw.

The ground element of the antenna device is electrically connected to the first chassis or the second chassis via the bearing part, the metal hinge shaft and the metal chassis mount member. Thus, the antenna device eliminates the need for drawing the cable and others from the ground element out of the hinge chassis. As such, frame-grounding can be achieved with a simple structure. Moreover, fixing the metal screw to the bearing part further enhances the electrical connection between the ground element and the bearing part.

While the holder component is fixed to the bearing part by the metal screw, the ground element is pressed to a metal component attached to the bearing part. The metal component may be a screw component having a threaded portion provided with a male screw on one end and a head portion provided with a female screw on an other end, wherein the screw component may fasten the hinge chassis to the bearing part by screwing the threaded portion to a screw hole formed in the bearing part, and the holder component may be fastened to the screw component by screwing the metal screw to the female screw. Thus, merely one screw component may be used to fasten the hinge chassis and the antenna device one after another to the bearing part. This allows not only an easy installation of the antenna device in the hinge device but also an easy disassembling for maintenance.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
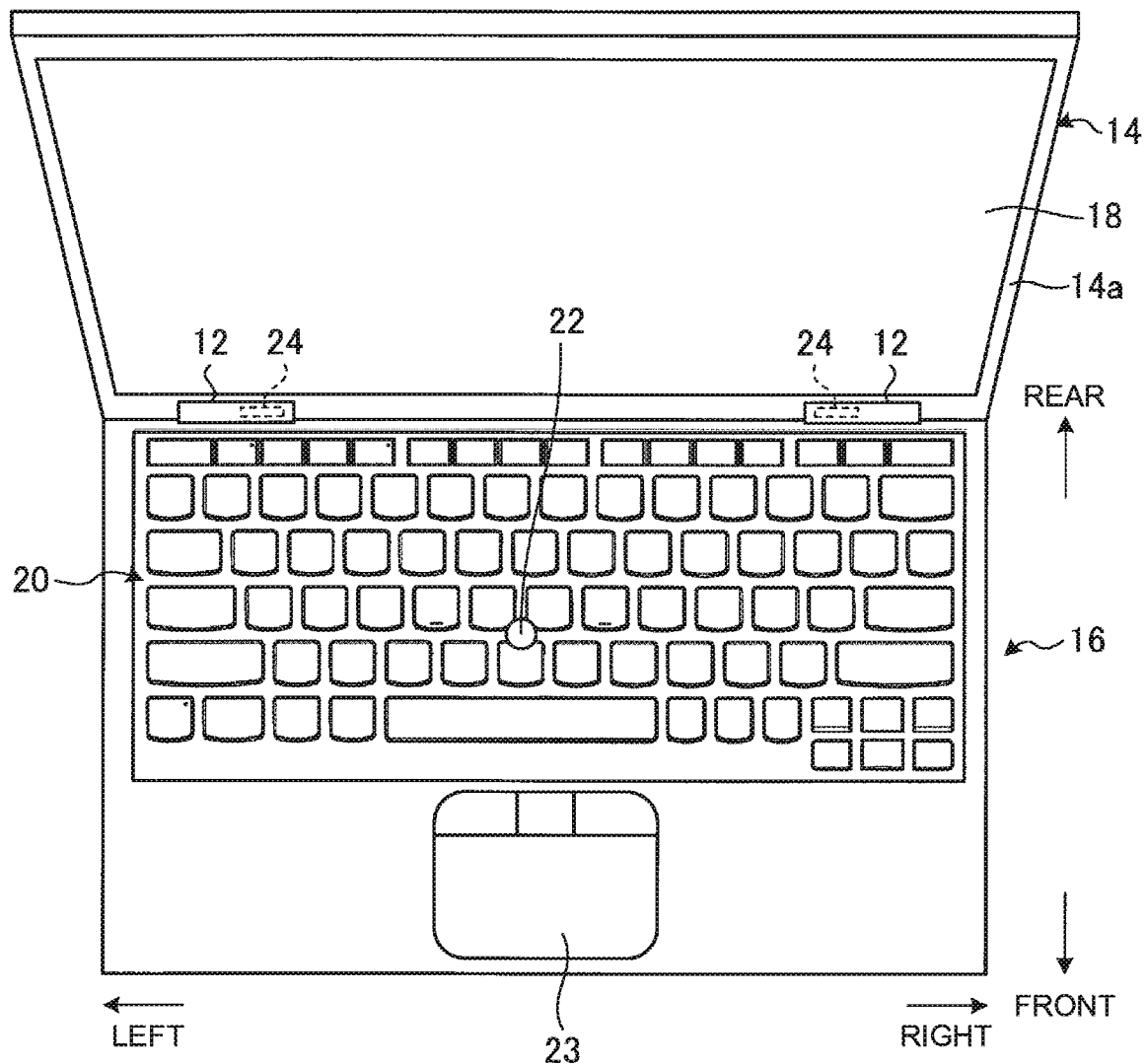
FIG. 1 is a plan view of an electronic apparatus, according to one embodiment.
Figure 2A:
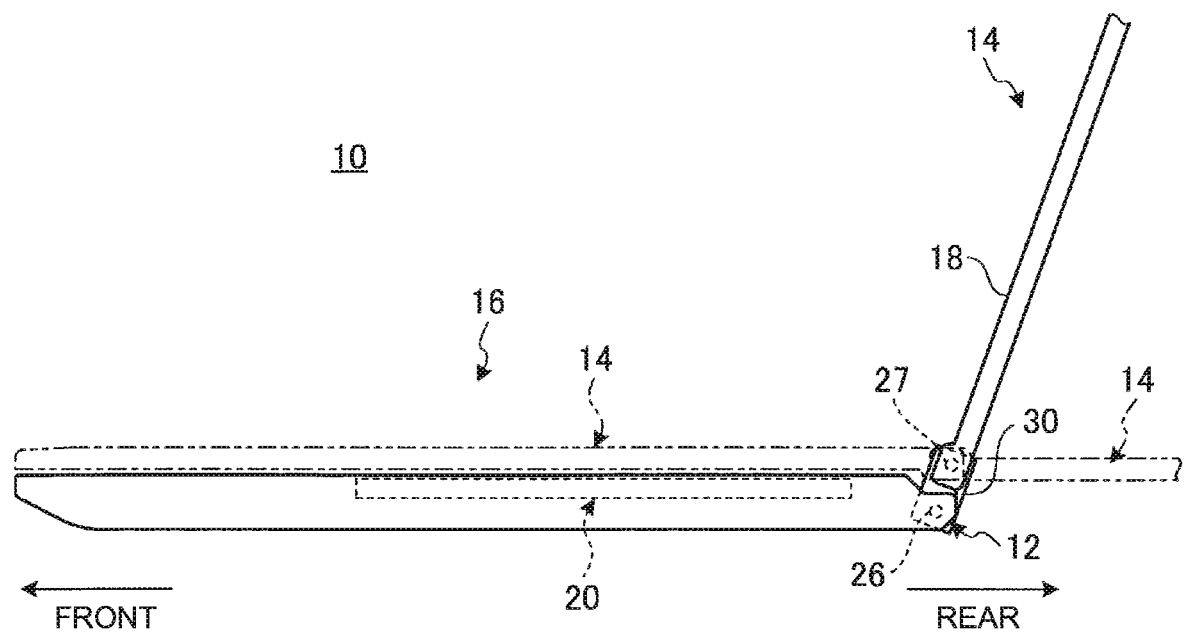
FIG. 2A is a side view illustrating that a display chassis of the electronic apparatus of FIG. 1 is opened.

FIG. 1 is a plan view of an electronic apparatus 10, according to one embodiment. FIG. 1 shows that a display chassis 14 has been rotated to be opened from a main body chassis 16 by a hinge device 12 (usage form). FIG. 2A is a side view illustrating that the display chassis 14 of the electronic apparatus 10 illustrated in FIG. 1 is opened. FIG.

2B is a side view illustrating that the display chassis 14 of the electronic apparatus 10 has been further opened and flipped around.

The electronic apparatus 10 of the present embodiment is a convertible PC which can be used both as a Laptop PC and a tablet PC. The display chassis 14 can be rotated from a 0-degree position where the display 18 faces the main body chassis 16 to a 360-degree position where the display chassis 14 has been flipped around. When the display chassis 14 is rotated to form an angle of about 90 to 180 degrees relative to the main body chassis 16, the electronic apparatus 10 is in notebook mode and can be suitably used as a Laptop PC (see FIGS. 1 and 2A). When the display chassis 14 is rotated 360 degrees relative to the main body chassis 16, the electronic apparatus 10 is in tablet mode and can be suitably used as a tablet PC (see FIG. 2B). The electronic apparatus 10 may be a common Laptop PC the display chassis 14 of which can be rotated within a range of 0 to about 180 degrees relative to the main body chassis 16. The electronic apparatus 10 may not only be the convertible PC or the Laptop PC but also preferably be a mobile phone, a smart phone, an electronic notebook or the like having two rotatably coupled chassis, for example.

The following description is based on the notebook mode illustrated in FIGS. 1 and 2A. With respect to a user looking at the display 18 and operating a keyboard device 20, a near side is referred to as "front," a far side as "rear," a thickness direction of the main body chassis 16 as "top-bottom," and a width direction as "left-right."

Figure 2B:
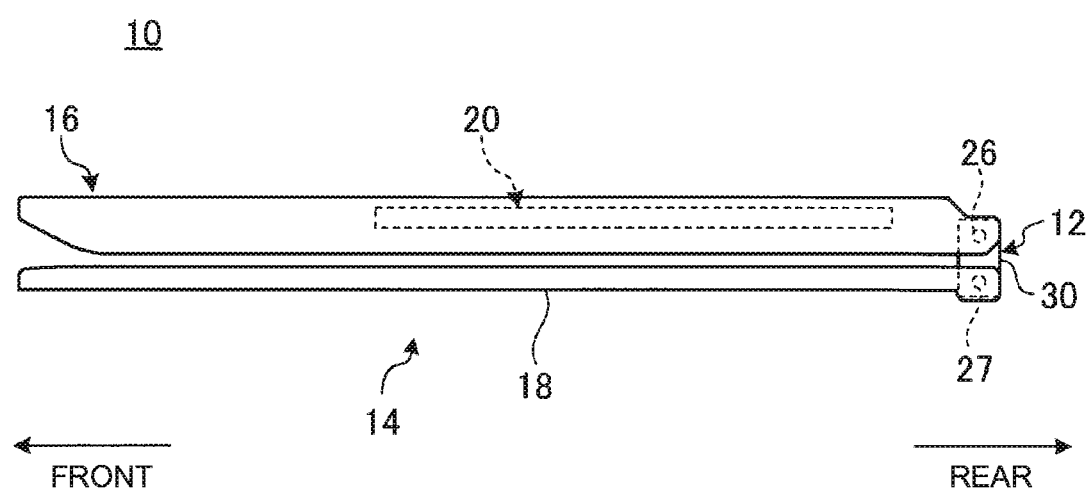
FIG. 2B is a side view illustrating that the display chassis of the electronic apparatus of FIG. 1 has been further opened and flipped around.

As illustrated in FIGS. 1, 2A and 2B, the electronic apparatus 10 includes a pair of left and right hinge devices 12 and 12 that rotatably couple a bottom end of the display chassis 14 and a rear end of the main body chassis 16.

The display chassis 14 is a thin rectangular box body. The display 18 is provided on a front surface of the display chassis 14. The display 18 is a touch panel type liquid crystal display, for example. The display chassis 14 is electrically connected to the main body chassis 16 by a cable 21 passing through the hinge device 12 (see FIG. 3).

The main body chassis 16 is a thin rectangular box body. The keyboard device 20, a pointing stick 22 and a touch pad 23 are provided on a top surface of the main body chassis 16. The main body chassis 16 houses various electronic components such as a motherboard, an arithmetic unit, a memory and so on that are not illustrated.

Figure 3:
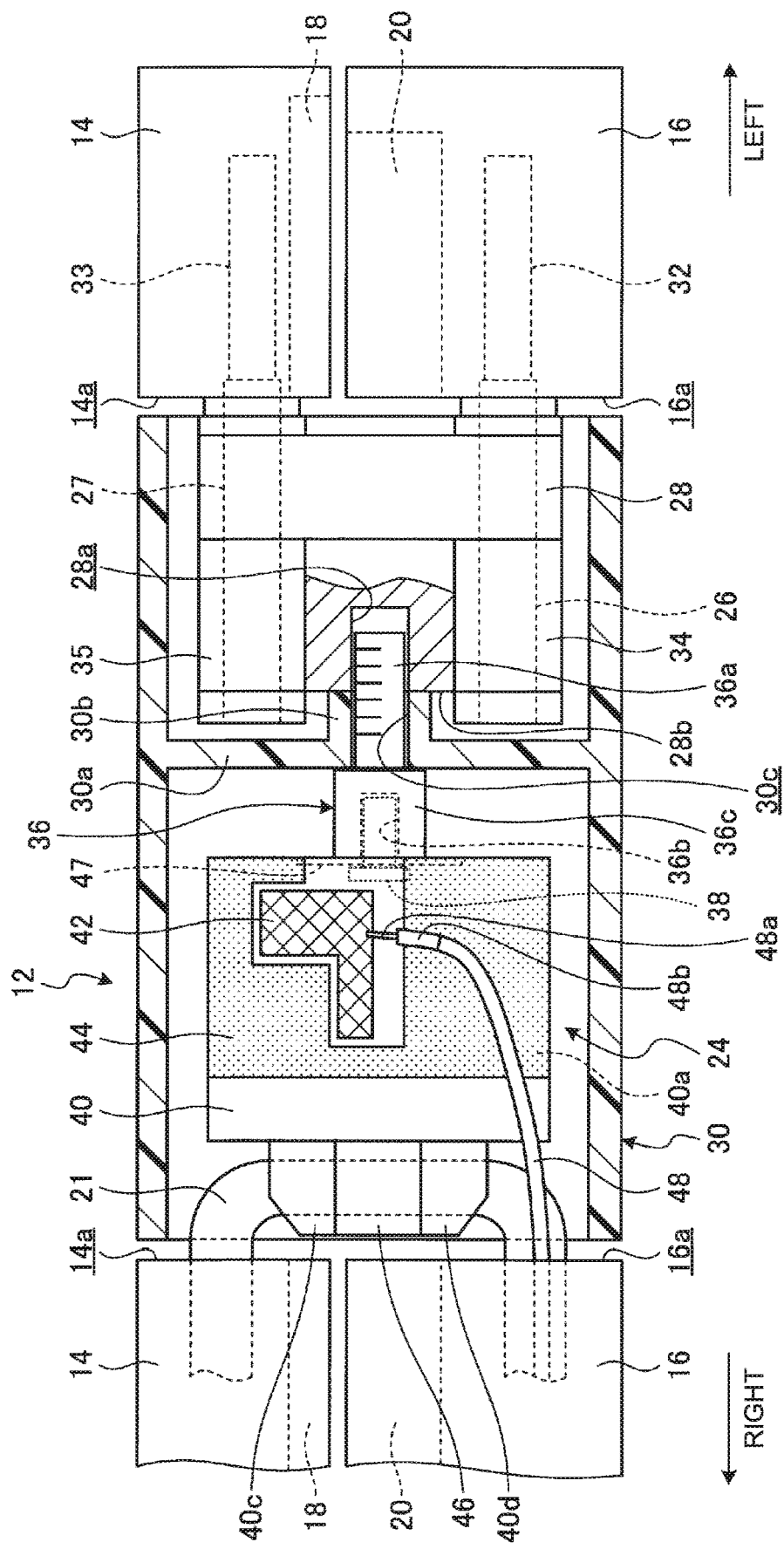
FIG. 3 is a partial sectional rear view illustrating a structure of a left hinge device and its peripheral part of the electronic apparatus in a 0-degree position.
Figure 4:
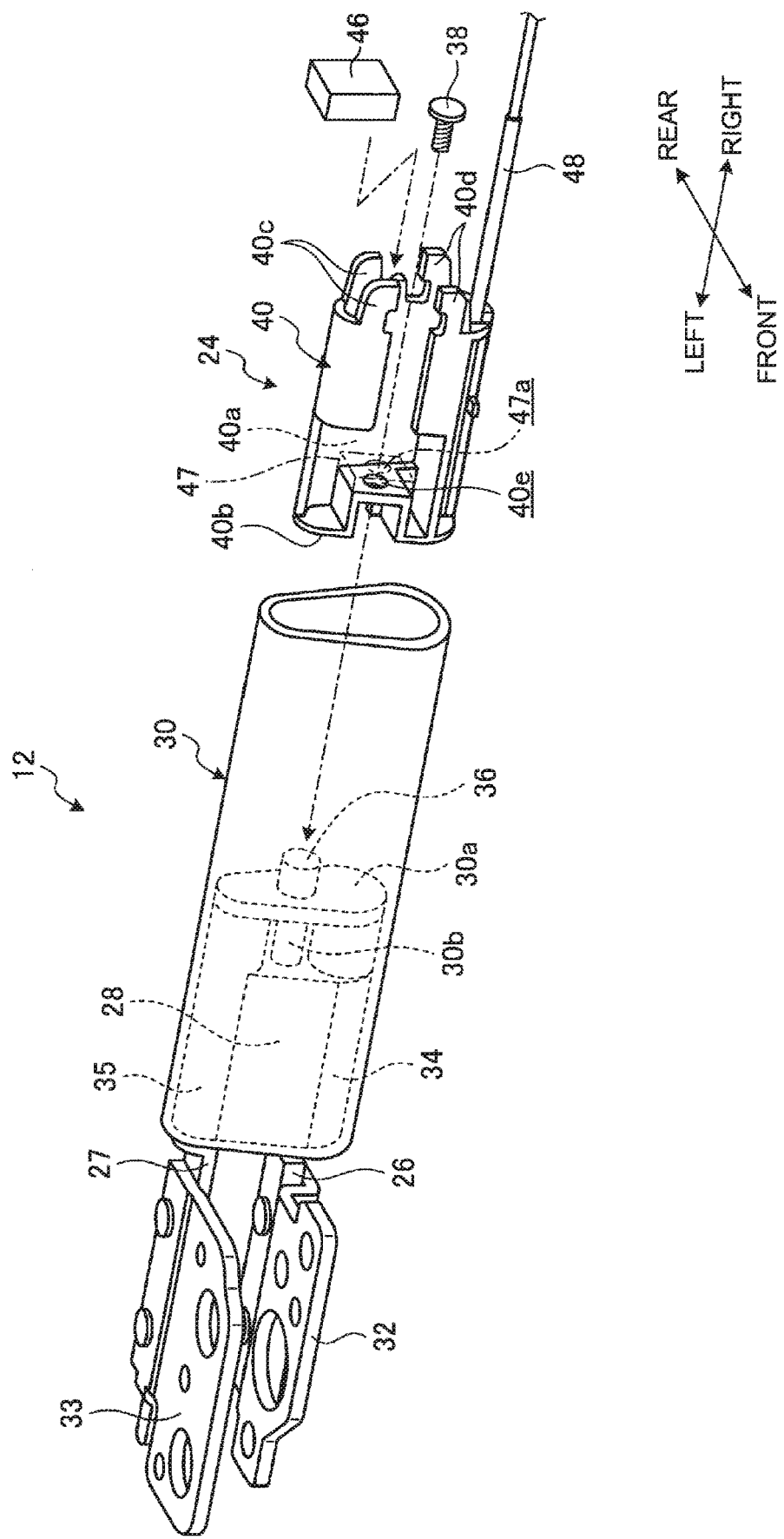
FIG. 4 is an exploded perspective view illustrating an attachment of an antenna device to the hinge device illustrated in FIG. 3.

FIG. 3 is a partial sectional rear view illustrating a structure of the left hinge device 12 and its peripheral part of the electronic apparatus 10 in the 0-degree position. FIG. 4 is an exploded perspective view illustrating an attachment of an antenna device 24 to the hinge device 12 illustrated in FIG. 3.

As illustrated in FIGS. 2A to 4, the hinge device 12 includes a first hinge shaft 26, a second hinge shaft 27, a bearing part 28 and a hinge chassis 30. The first hinge shaft 26, the second hinge shaft 27 and the bearing part 28 are made of a metal material such as stainless steel, steel, aluminum or the like. The hinge chassis 30 is made of a radio wave transmissive material. The radio wave transmissive material is a material that allows radio waves to pass through and may include resin materials such as polyphenylene sulfide (PPS), ceramics, glass and so on, for example.

The left and right hinge devices 12 and 12 are identical except that they are formed in a symmetrical structure. The antenna device 24 is housed in the hinge chassis 30 of each of the left and right hinge devices 12 and 12 (see FIG. 1). Details will be described later. The antenna device 24 may be provided only in one of the left and right hinge devices 12.

As illustrated in FIGS. 3 and 4, the first hinge shaft 26 is a pin-shaped member extending in a left-right direction. One end of the first hinge shaft 26 is rotatably supported by the bearing part 28. An other end of the first hinge shaft 26 protrudes to the outside of the hinge chassis 30 and is fixed to the main body chassis 16 via a first chassis mount member 32. The first chassis mount member 32 is a metal plate to be fixed to the main body chassis 16 with screws and is unrotatably fixed to the other end of the first hinge shaft 26. The main body chassis 16 is thus integrally structured with the first hinge shaft 26 and is rotatable relative to the bearing part 28.

The second hinge shaft 27 is a pin-shaped member extending in the left-right direction. One end of the second hinge shaft 27 is rotatably supported by the bearing part 28. An other end of the second hinge shaft 27 protrudes to the outside of the hinge chassis 30 and is fixed to the display chassis 14 via a second chassis mount member 33. The second chassis mount member 33 is a metal plate to be fixed to the display chassis 14 with screws and is unrotatably fixed to the other end of the second hinge shaft 27. The display chassis 14 is thus integrally structured with the second hinge shaft 27 and is rotatable relative to the bearing part 28.

Figure 5:
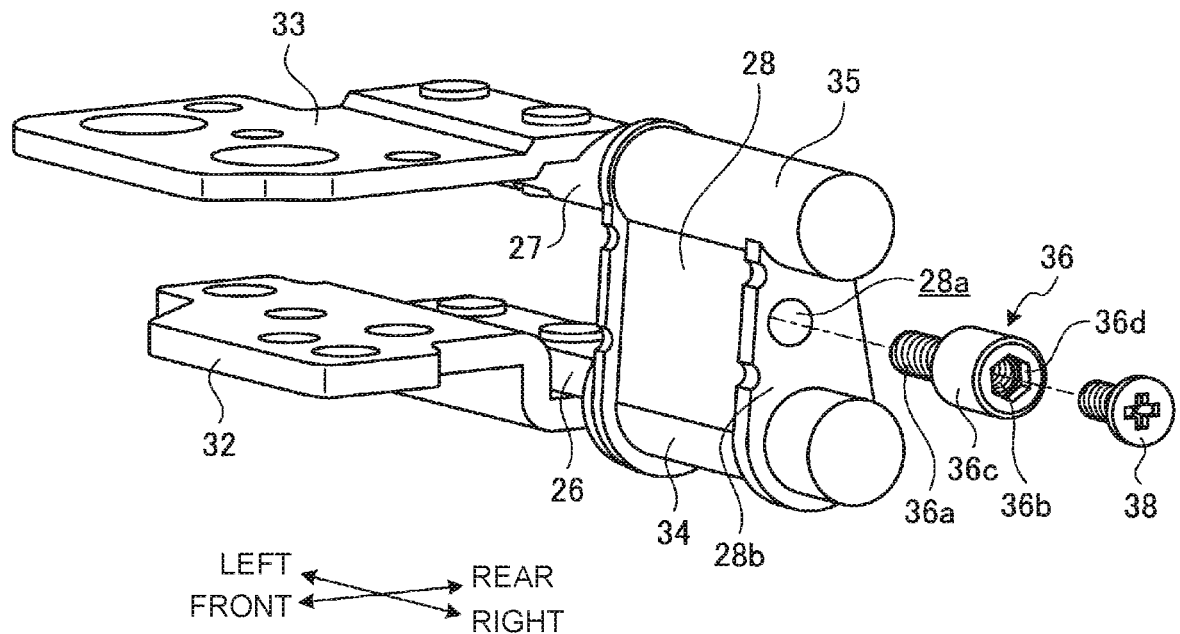
FIG. 5 is a perspective view illustrating a structure of hinge shafts and a bearing part.

FIG. 5 is a perspective view illustrating a structure of the hinge shafts 26 and 27 and the bearing part 28. As illustrated in FIGS. 3 to 5, the bearing part 28 is a block-like member having a sectional shape substantially identical to that of the hinge chassis 30. The bearing part 28 rotatably supports each of the hinge shafts 26 and 27. The bearing part 28 houses a gear mechanism that synchronizes a rotation of the first hinge shaft 26 and a rotation of the second hinge shaft 27. Instead of thus synchronizing rotations of the hinge shafts 26 and 27, the hinge device 12 may be capable of switching between rotation shafts depending on a rotation range of the display chassis 14.

A first torque generating mechanism 34 and a second torque generating mechanism 35 are coupled to the bearing part 28. The torque generating mechanisms 34 and 35 are structured by arranging a plurality of plate springs in an axial direction so as to be contacted with each other, for example. The first torque generating mechanism 34 sheathes the first hinge shaft 26 to generate a predetermined rotational torque at the first hinge shaft 26. The second torque generating mechanism 35 sheathes the second hinge shaft 27 to generate a predetermined rotational torque at the second hinge shaft 27. This causes, in the electronic apparatus 10, certain rotational torque to be involved in a rotating operation of the display chassis 14 and the main body chassis 16 so that the rotating operation is stabilized and smoothed.

The bearing part 28 has a screw hole 28a. The screw hole 28a is provided on a side surface 28b that is opposite from the chassis mount member 32 and 33. The screw hole 28a is disposed at a position between the hinge shafts 26 and 27. The screw hole 28a serves to attach the hinge chassis 30 and the antenna device 24.

As illustrated in FIGS. 3 and 4, the hinge chassis 30 is a tubular cap housing the hinge shafts 26 and 27, the bearing part 28 and the antenna device 24. The hinge chassis 30 has a substantially elliptical sectional shape. The hinge chassis 30 is arranged in concave parts 14a and 16a provided in the rear ends of the display chassis 14 and the main body chassis 16 (see FIG. 3) and rotates in the concave parts 14a and 16a.

The hinge chassis 30 has, in its tubular inner space, an attachment plate 30a substantially in a middle in the left-right direction. The attachment plate 30a serves as a partition wall dividing the inner space of the hinge chassis 30 into left and right compartments. A columnar boss portion 30b is formed substantially in a center of the attachment plate 30a to protrude to the bearing part 28 side. A screw insertion hole 30c is formed through the boss portion 30b. The hinge chassis 30 is fixed to the bearing part 28 by a screw component 36 (see FIGS. 5 and 6) inserted through the screw insertion hole 30c. The hinge chassis 30 is thus integrated with the bearing part 28 and can rotate relative to the hinge shafts 26 and 27 accordingly.

Figure 6:
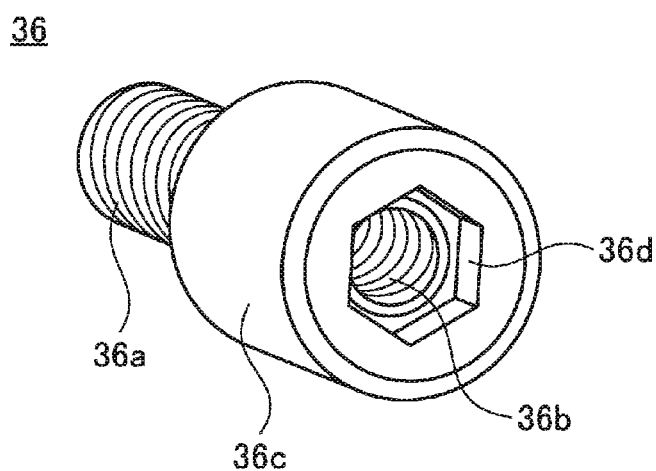
FIG. 6 is a perspective view illustrating a structure of a screw component.

FIG. 6 is a perspective view illustrating a structure of a screw component 36. As illustrated in FIG. 6, the screw component 36 is a metal component having a threaded portion 36a provided with a male screw and a head portion 36c provided with a female screw 36b on a top surface thereof. The threaded portion 36a is a male screw having a screw diameter of 1.4 mm (M1.4), for example. The head portion 36c is formed in a columnar shape. The head portion 36c is provided with the female screw 36b on the top surface opposite from the threaded portion 36a, and a hexagonal female screw 36d is provided at an opening edge of the female screw 36b. The female screw 36b has a screw diameter of 1.2 mm (M1.2), for example.

The screw component 36 is configured such that proper tightening torque of the threaded portion 36a is larger than that of a metal screw 38 to be screwed to the female screw 36b. The threaded portion 36a is a portion which is screwed to the screw hole 28a of the bearing part 28. The female screw 36b is a portion to which the metal screw 38 is screwed for attaching the antenna device 24. The hexagonal female screw 36d is a portion which engages with a prescribed hexagonal male screw for fastening the threaded portion 36a. Note that the proper tightening torque is a target tightening torque for fixing, e.g., the threaded portion 36a and the metal screw 38 with proper fastening strength. In the present embodiment, the screw diameter of the threaded portion 36a is larger than that of the female screw 36b. Likewise, the proper tightening torque of the threaded portion 36a is larger than that of the female screw 36b.

Figure 7:
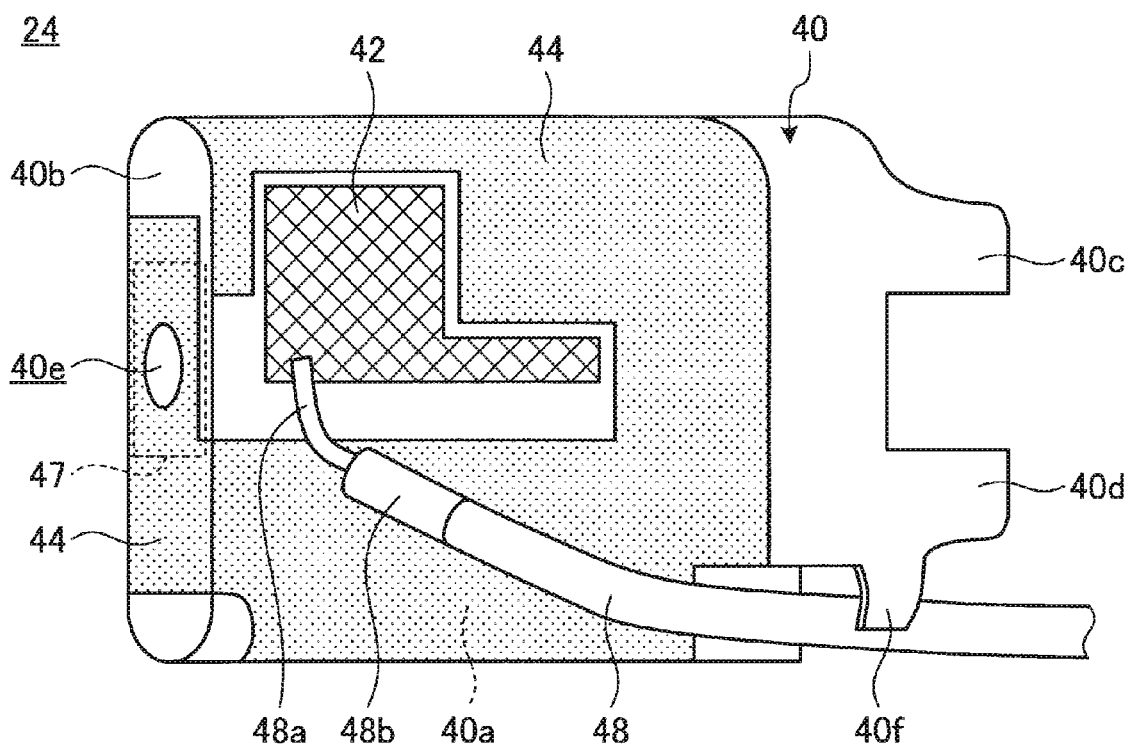
FIG. 7 is a perspective view of the antenna device.

FIG. 7 is a perspective view of the antenna device 24. The antenna device 24 is an antenna for transmitting and receiving a radio wave of the wireless LAN, for example. The antenna device 24 may also be compatible with networks other than the wireless LAN such as the wireless WAN. As illustrated in FIGS. 3, 4 and 7, the antenna device 24 includes a holder component 40, an antenna element 42 and a ground element 44.

The holder component 40 is used to dispose the antenna device 24 in the hinge chassis 30. Just like the hinge chassis 30 described above, the holder component 40 is made of a radio wave transmissive material. In the present embodiment, the holder component 40 is made of resin. The holder component 40 has an antenna formation surface 40a, a pressing surface 40b, a pair of top and bottom holding arms 40c and 40d and a screw insertion hole 40e.

The antenna formation surface 40a faces a rear side when housed in the hinge chassis 30. That is, the antenna formation surface 40a is a surface facing in the opposite direction from the main body chassis 16 (display chassis 14). The pressing surface 40b faces the side surface 28b of the bearing part 28 when housed in the hinge chassis 30. The top and bottom holding arms 40c and 40d each includes a pair of front and rear portions. The holding arms 40c and 40d have a hook-like shape bent toward each other. A U-shaped bent portion of the cable 21 is held between the front and rear portions of the upper holding arm 40c and between the front and rear portions of the bottom holding arm 40d (see FIG. 3). As described above, the cable 21 is taken from the main body chassis 16 and connected to the display chassis 14. A rubber block 46 is fitted between the holding arms 40c and 40d to prevent the cable 21 from coming off. The rubber block 46 also functions as a cover, so that the inside of the hinge chassis 30 is not visible through an opening thereof. The screw insertion hole 40e is a hole through which the metal screw 38 is inserted.

The antenna element 42 and the ground element 44 are conductors provided by screen printing, adhering or the like, for example. The antenna element 42 is a conductive pattern for transmitting and receiving radio waves. The ground element 44 is a conductive portion that serves as a ground for the antenna device 24. As illustrated in FIG. 7, the antenna element 42 is disposed on a part of the antenna formation surface 40a. The ground element 44 is disposed in such a wide area covering from a part of the antenna formation surface 40a surrounding the antenna element 42 to the pressing surface 40b. The ground element 44 surrounds the screw insertion hole 40e on the pressing surface 40b.

As illustrated in FIG. 4, a metal member 47 is provided on an inner surface side of the pressing surface 40b. A screw insertion hole 47a is formed in the metal member 47 to be coaxial with the screw insertion hole 40e. The metal member 47 is a metal plate electrically connected to the ground element 44. The metal member 47 functions to securely connect the ground element 44 to the metal screw 38. The metal member 47 also functions as a reinforcement which prevents a deformation of the holder component 40 made of a resin material upon fastening of the metal screw 38.

The antenna device 24 is electrically connected to the motherboard, a communication circuit and others in the main body chassis 16 via an antenna cable 48. The antenna cable 48 is a coaxial cable, for example, and a central conductor 48a thereof is electrically connected to the antenna element 42, while a surrounding shielding layer 48b is electrically connected to the ground element 44 (see FIG. 7). The antenna cable 48 is held by a holding claw 40f provided at a bottom of the holder component 40 and drawn into the main body chassis 16 along with the cable 21.

Specific description is now made of a coupling structure and operation of the hinge device 12 and the antenna device 24 thus configured.

First, as illustrated in FIG. 4, the hinge chassis 30 is coupled to the bearing part 28, wherein the bearing part 28 is an assembled article to which the hinge shafts 26 and 27 and the chassis mount members 32 and 33 are integrally fitted in advance. The bearing part 28 is inserted into the hinge chassis 30 from one side (left side in FIG. 4) until the side surface 28b abuts the boss portion 30b of the attachment plate 30a (see FIG. 3). The screw component 36 is then inserted into the hinge chassis 30 from the other side (right side in FIG. 4). A prescribed tool is fitted into the hexagonal female screw 36d of the screw component 36 to screw the threaded portion 36a to the screw hole 28a of the bearing part 28 through the screw insertion hole 30c. The hinge chassis 30 is thus fastened to the bearing part 28 by virtue of the threaded portion 36a of the screw component 36. The screw component 36 is now disposed with the head portion 36c projecting from the attachment plate 30a (see FIGS. 3 and 4).

Subsequently, as illustrated in FIG. 4, the antenna device 24 is inserted into the hinge chassis 30 from the side opposite from the bearing part 28 (right side in FIG. 4). The antenna device 24 is advanced into the hinge chassis 30 until the pressing surface 40b abuts the top surface of the head portion 36c of the screw component 36. This is followed by screwing the metal screw 38 to the female screw 36b of the screw component 36 through the screw insertion hole 47a of the metal member 47 and the screw insertion hole 40e of the holder component 40. The holder component 40 of the antenna device 24 is thus fastened to the screw component 36, i.e., to the bearing part 28 by the metal screw 38. Consequently, the antenna device 24 is integrally fixed to the bearing part 28 and the hinge chassis 30 while being housed in the hinge chassis 30.

Finally, after the cable 21 is held by the holding arms 40c, 40d of the holder component 40, the rubber block 46 is fitted. The hinge device 12, into which the antenna device 24 has thus been incorporated, is installed in the main body chassis 16 and the display chassis 14 to complete the assembly of the electronic apparatus 10.

Note that, in the hinge device 12 illustrated in FIG. 3, the chassis mount members 32 and 33 respectively coupled to the chassis 16 and 14, the hinge shafts 26 and 27 respectively coupled to the chassis mount members 32 and 33 and the bearing part 28 coupled to the hinge shafts 26 and 27 are all made of metal. The ground element 44 on the pressing surface 40b of the antenna device 24 is pressed to the top surface of the head portion 36c of the screw component 36 which has been fixed to the bearing part 28. And the metal screw 38 is fixed to the screw component 36 while abutting the metal member 47 electrically connected to the ground element 44. The ground element 44 of the antenna device 24 is thus electrically connected to the chassis 16 and 14 so as to be securely frame-grounded.

As described above, the electronic apparatus 10 of the present embodiment includes the hinge device 12 and the antenna device 24. The hinge device 12 includes the bearing part 28 that is made of a metal material. The hinge shafts 26 and 27 supported by the bearing part 28 as well as the chassis mount members 32 and 33 coupling the hinge shafts 26 and 27 to the main body chassis 16 and the display chassis 14 are also made of a metal material. The antenna device 24 is housed in the hinge chassis 30 made of a radio wave transmissive material, and the ground element 44 is electrically connected to the bearing part 28.

Accordingly, in the electronic apparatus 10, the ground element 44 of the antenna device 24 is electrically connected to the chassis 16 and 14 via the bearing part 28, hinge shafts 26 and 27 and chassis mount members 32 and 33 that are made of metal. The antenna device 24 thus eliminates the need for drawing the cable and others from the ground element 44 out of the hinge chassis 30. As such, frame-grounding is achieved with a simple structure, which allows a reduction of manufacturing cost. It is also to be noted that the ground element 44 is connected to the bearing part 28 while being housed in the hinge chassis 30 along with the holder component 40. This would maintain the connection between the ground element 44 and the bearing part 28 if an external force or impact is applied by an operation of the hinge device 12, which enables a stable performance to be kept for a long period of time. Furthermore, housing the antenna device 24 in the hinge chassis 30 enables the electronic apparatus 10 to have constantly stable antenna performance regardless of the angular position of the display chassis 14.

In the electronic apparatus 10, the holder component 40 is fixed to the bearing part 28 by the metal screw 38. And the metal screw 38 is electrically connected to the ground element 44. Consequently, fixing the metal screw 38 to the bearing part 28 enhances the electrical connection between the ground element 44 and the bearing part 28. Here, while the holder component 40 is fixed to the bearing part 28 by the metal screw 38, the ground element 44 is pressed to the head portion 36c of the screw component 36 which is a metal component fixed to the bearing part 28. This makes the electrical connection between the ground element 44 and the bearing part 28 even more stable.

The hinge chassis 30 may be fixed to the bearing part 28 by other means than the screw component 36. In that case, the metal screw 38 may be directly screwed to the screw hole 28a of the bearing part 28. The ground element 44 on the pressing surface 40b is then directly pressed by the side surface 28b of the bearing part 28.

The electronic apparatus 10 uses the screw component 36 having the threaded portion 36a provided with the male screw on one end and the head portion 36c provided with the female screw 36b on the other end. The screw component 36 fastens the hinge chassis 30 to the bearing part 28 by screwing the threaded portion 36a to the screw hole 28a formed in the bearing part 28. The screw component 36 is also fastened to the holder component 40 by screwing the metal screw 38 to the female screw 36b.

Thus, in the electronic apparatus 10, merely one screw component 36 is used to fasten the hinge chassis 30 and the antenna device 24 one after another to the bearing part 28 which serves as a main body part of the hinge device 12. This allows not only an easy installation of the antenna device 24 in the hinge device 12 but also an easy disassembling for maintenance. Assume, for example, that any malfunctions are found in the antenna device 24 after it is installed in the hinge device 12. The antenna device 24 can then be easily pulled out of the hinge chassis 30 by merely removing the metal screw 38. Note particularly that the hinge device 12 and the antenna device 24 are generally made by different manufactures as assembled articles. In the present embodiment, the antenna device 24 and the hinge device 12 can therefore be easily replaced upon malfunction or others, which increases manufacturing efficiency.

Note also that the screw component 36 is configured such that the proper tightening torque of the threaded portion 36a for first fastening the hinge chassis 30 to the bearing part 28 is larger than that of the female screw 36b (metal screw 38) for thereafter fixing the antenna device 24. That is, the antenna device 24 is fastened to the screw component 36 with a smaller tightening torque than that of the threaded portion 36a fastened to the bearing part 28 first. During a fastening operation of the antenna device 24, a tightening force of the metal screw 38 therefore does not affect a fastening part of the bearing part 28 and the hinge chassis 30 having been fixed already, which prevents any displacement of mounting posture of the hinge chassis 30. It is needless to say that, during a removing operation of the antenna device 24, removing the metal screw 38 does not affect the fastening part of the bearing part 28 and the hinge chassis 30, either.

Using merely one screw component 36 to fasten the hinge chassis 30 and the antenna device 24 to the bearing part 28 enables the number of components as well as the size of the apparatus structure to be reduced. Note particularly that the threaded portion 36a and the female screw 36b are aligned on the axis of the screw component 36. This results in that height and thickness dimensions of the hinge chassis 30 are substantially not affected, thereby contributing to a miniaturization of the hinge device 12.

As has been described, the present invention provides an improved electronic apparatus that enables an antenna device to be frame-grounded by a simple structure while allowing the antenna device to be mounted in a hinge device.

The above description has exemplarily illustrated the hinge device 12 of a dual-axis structure. The hinge device 12, however, may be of a single-axis structure that employs only one of the first hinge shaft 26 and the second hinge shaft 27.

The above description has exemplarily illustrated the screw component 36 including the male screw (threaded portion 36a) and the female screw 36b. However, the screw component 36 may, for example, be provided with male screws on both ends thereof. In that case, the metal screw 38 may be substituted by a metal nut.

While the invention has been particularly shown and described with reference to a preferred embodiment, it will be understood by those skilled in the art that various changes in form and detail may be made therein without departing from the spirit and scope of the invention.

What is claimed is:

1. An electronic apparatus comprising:
   a first chassis and a second chassis;
   a hinge device rotatably connects said first chassis to said second chassis, wherein said hinge device includes:
   a hinge shaft;
   a bearing part rotatably supports a first end of said hinge shaft;
      a chassis mount member fixes a second end of said hinge shaft to said first chassis or said second chassis; and
      a hinge chassis, made of a radio wave transmissive material, houses said bearing part; and
   an antenna device includes:
      a holder component, housed within said hinge chassis, is fixed to said bearing part via a metal screw;
      an antenna element supported by said holder component; and
      a ground element, supported by said holder component, is electrically connected to said bearing part and said metal screw.

2. The electronic apparatus of claim 1, wherein said hinge shaft is made of metal.

3. The electronic apparatus of claim 1, wherein said bearing part and said chassis mount member are made of metal.

4. The electronic apparatus of claim 1, wherein said ground element is pressed to a metal component attached to said bearing part while said holder component is fixed to said bearing part by said metal screw.

5. The electronic apparatus of claim 4, wherein said metal component is a screw component having a threaded portion provided with a male screw on one end and a head portion provided with a female screw on an other end.

6. The electronic apparatus of claim 5, wherein said screw component fastens said hinge chassis to said bearing part by screwing said threaded portion to a screw hole formed in said bearing part, and said holder component is fastened to said screw component by inserting said metal screw to said female screw.

7. The electronic apparatus of claim 6, wherein said ground element is provided on one outer surface of said holder component and pressed between said one outer surface and said head portion of said screw component.

8. The electronic apparatus of claim 6, wherein proper tightening torque of said male screw is larger than that of said female screw.

9. The electronic apparatus of claim 7, wherein said hinge shaft includes a first hinge shaft coupled to said first chassis and a second hinge shaft coupled to said second chassis.

10. The electronic apparatus of claim 9, wherein said bearing part is provided with said screw hole at a position between said first hinge shaft and said second hinge shaft.

11. An electronic apparatus comprising:
    a first chassis and a second chassis;
    a hinge device, rotatably connecting said first chassis to said second chassis, includes:
       a hinge shaft;
       a bearing part rotatably supports a first end of said hinge shaft;
       a chassis mount member fixes a second end of said hinge shaft to said first chassis or said second chassis; and
       a hinge chassis, made of a radio wave transmissive material, houses said bearing part; and
    an antenna device includes:
       a holder component housed in said hinge chassis;
       an antenna element supported by said holder component; and
       a ground element supported by said holder component and electrically connected to said bearing part.

12. The electronic apparatus of claim 11, wherein said hinge shaft is made of metal.

13. The electronic apparatus of claim 11, wherein said bearing part and said chassis mount member are made of metal.

* * * * *